United States Patent [19]

Martin

[11] Patent Number: 5,841,992
[45] Date of Patent: Nov. 24, 1998

[54] NETWORK-TO-SERIAL DEVICE INTELLIGENT CONVERTER

[75] Inventor: John Steven Martin, McHenry, Ill.

[73] Assignee: Snap-On Tools Company, Kenosha, Wis.

[21] Appl. No.: 621,218

[22] Filed: Mar. 25, 1996

[51] Int. Cl.6 .............................. C06F 13/38; C06F 15/17
[52] U.S. Cl. ................... 395/200.8; 395/200.66
[58] Field of Search .................. 364/484–487; 395/200.2, 882, 885, 200.48, 200.42, 200.57, 200.58, 200.6, 831, 200.8, 200.66

[56] References Cited

U.S. PATENT DOCUMENTS

| | | |
|---|---|---|
| 4,403,111 | 9/1983 | Kelly . |
| 4,443,884 | 4/1984 | Swarz . |
| 4,637,011 | 1/1987 | Crabbe, Jr. . |
| 4,709,329 | 11/1987 | Hecker . |
| 4,723,120 | 2/1988 | Petty, Jr. . |
| 4,728,754 | 3/1988 | Fowler et al. . |
| 4,852,041 | 7/1989 | Nakano . |
| 5,051,980 | 9/1991 | Olsen . |
| 5,159,684 | 10/1992 | Kroll et al. . |
| 5,166,977 | 11/1992 | Ross . |
| 5,194,758 | 3/1993 | Ver Meer . |
| 5,257,289 | 10/1993 | Jopson . |
| 5,274,311 | 12/1993 | Littlejohn et al. . |
| 5,305,215 | 4/1994 | Brekkestran et al. . |
| 5,321,819 | 6/1994 | Szczepanek ........................ 395/200.6 |
| 5,349,685 | 9/1994 | Houlberg . |
| 5,357,609 | 10/1994 | Sellers et al. . |
| 5,378,067 | 1/1995 | Severson et al. . |
| 5,394,458 | 2/1995 | Allen et al. . |
| 5,396,486 | 3/1995 | Scott . |
| 5,397,928 | 3/1995 | Chan et al. . |
| 5,406,176 | 4/1995 | Sugden . |
| 5,434,976 | 7/1995 | Tan et al. ............................ 380/200.43 |
| 5,490,209 | 2/1996 | Kennedy et al. ........................ 379/97 |
| 5,515,099 | 5/1996 | Cortjens et al. ........................ 348/15 |
| 5,517,662 | 5/1996 | Coleman et al. .................... 395/200.8 |
| 5,526,037 | 6/1996 | Cortjens et al. ....................... 395/831 |
| 5,557,744 | 9/1996 | Kobayakawa et al. .............. 395/200.8 |
| 5,581,708 | 12/1996 | Iijima ..................................... 395/831 |
| 5,664,229 | 9/1997 | Bhargava et al. ..................... 395/831 |

OTHER PUBLICATIONS

Lonworks Network FAQ, http://www.echelon/com, 1995.
STLA/2 Serial Lontalk Adapter Modem 7300, 1995.
Serial Lontalk Adapter (SLTA/2) Model 73000, pp. 75 & 77, Eschelon brochure.; undated.

*Primary Examiner*—Mark H. Rinehart
*Attorney, Agent, or Firm*—Emrich & Dithmar

[57] ABSTRACT

An intelligent converter is programmably adaptable for interfacing a data processing system to any one of plural selectable serial devices, each uniquely responsive to a serial data bit stream of a device-specific data communication format. The data processing system is adapted for communication with externally coupled resources in accordance with a predefined network communication protocol of the type including user-programmable network function layers and non-programmable network function layers to coordinate and ensure the integrity of transfer of data therebetween.

17 Claims, 3 Drawing Sheets

NETWORK-TO-SERIAL DEVICE INTELLIGENT CONVERTER

BACKGROUND OF THE INVENTION

1. Field of the Invention

The present invention relates to an intelligent converter for interfacing any one of a variety of serial devices to a network device, and more particularly, to a converter that can be programmed to recognize and interface with various serial devices of different data communication formats, including various RS-232 devices.

2. Description of the Prior Art

Networks, such as local area networks (LANs), facilitate, among other things, the transfer of files between commonly-coupled terminals, the sharing of resources such as printers, modems, etc., and the accessing of common data bases. Each terminal (or node) on the network requires a transceiver function to allow transmission of information from the terminal to the network and receipt of information at the terminal from the network.

Network resources communicate by passing information over any one of a variety of transceiver circuits, including twisted-pair cabling, radio-frequency (RF) circuitry, RS-485 lines, power carrier lines, and infrared transceiver circuits.

Regardless of the transceiver circuit connecting a terminal to the network, a dedicated processor—such as the Neurons chip commercially available from Echelon Corp., the technical literature for which integrated circuit is incorporated herein by reference—is required, which constantly watches the traffic on the network to accurately predict when the network will be available for transmission of data, in the form of data packets, among the available resources, i.e., from terminal to terminal. For this purpose, all data to be presented on the network must be uniquely packaged by appropriate protocol codes which, when sensed by each receiving terminal's respective dedicated processor, will permit that processor to recognize and handle all necessary service requests for any transmissions and necessary retransmissions without requiring further controller input from the terminal. Since most of the network interface activity is carried out by a dedicated processor, little network processing overhead is required of the terminal.

The protocol codes that attach to the data packets transmitted over the network are unique to each network. Unless a terminal or node is configured to receive data packet streams (by way of a suitable transceiver circuit) and unless it includes the intelligent converter circuitry necessary to interpret the protocol codes attached to the transmitted data, the terminal can neither transmit nor receive data over the network. Many network protocols, such as Lonworks™, come in a variety of function complexities and allow multiple nodes on a network to communicate in a peer-to-peer fashion among each other, i.e., allow any node to communicate with any other node on the network.

Lonworks™, a trademark of Echelon Corp., is a commercially available multi-layered-service communication protocol used in network environments, and is most popular in building HVAC control systems. Generally, network protocol functions, such as those provided with Lonworks™, are logically separated into lower-layer network functions, such as media access control, collision avoidance, acknowledgment, retries, duplicate message detection, message validation, authentication, and priority processing, and upper-layer (user-programmable or application-dependent) functions.

A terminal dedicated processor, such as the Neurons chip and associated firmware and logic circuitry, are designed to handle both lower- and upper-layer protocol functions, and may be configured for this purpose in accordance with the manufacturer's specifications. In this regard, the Neurons chip is a link between the terminal device and the network.

Quite often it becomes necessary to add an external resource onto the network, but because the resource may have a data format which includes protocol codes different from those of the terminal device to which it is attached, the resource cannot be connected to the network. For example, many devices are based on an RS-232 asynchronous serial communication standard. The RS-232 standard is based on a point-to-point architecture that allows only two devices to communicate with each other. In the past, when interfacing an RS-232 device, such as for example, a CRT, a terminal, a printer, a card reader, or a modem, to a network, such as a Lonworks™ network, a converter was employed which allows the RS-232 device to be emulated as a node on the network.

Referring to FIG. 1, a conventional converter 10 is shown which allows the different data bit streams of a network terminal 20 (such as an engine analyzer) and an RS-232 device 30 (such as a gas analyzer) to be converted prior to transmission to the other of the devices, forming in effect a gateway therebetween.

The converter 10 includes a transceiver circuit 11, such as an RS-485 network interface circuit, a Neurons chip 12, and an RS-232 interface circuit 13, such as the Motorola MC 145407 which converts RS-232 voltage levels to and from TTL and CMOS input and output levels. The Neuron® chip 12 receives and transmits serial data from, for example the gas analyzer 30, using eight-bit character frames, with one start bit and one stop bit, characteristic of the RS-232 standard. A new character frame may start at any time after the end of the stop bit. The RS-232 standard is termed asynchronous because it is not necessary to share a clock between the transmitting and receiving devices. Both devices can use independent local clocks running at the same nominal frequency. Actual synchronization is on a character-by-character basis using the start and stop bits.

The Neuron® chip supports this asynchronous serial data format as well as communication between multiple nodes in a network. Thus, the same Neuron® chip can also be part of the converter logic circuitry for interfacing, for example, the gas analyzer 30 to the engine analyzer 20. For this purpose, the converter 10 may be configured as an external unit, as shown in FIG.1, coupled to the engine analyzer 20 by way of network communication line 15, and communicates with a like transceiver circuit 21 and a dedicated network processor 22 (such as a second Neuron® chip) located physically on a board connectable to the engine analyzer motherboard (not shown). Alternatively, converter 10 may be entirely internal to the engine analyzer 20 and attached to the gas analyzer 30 via an RS-232 port (not shown) on, for example, the rear of the engine analyzer housing.

The Neuron® chip, when configured to interface a serial device to a network device, as shown in FIG. 1, must be uniquely programmed, in accordance with the technical specifications for this chip, to handle appropriate data conversion functions. Toward this end, the multi-layered nature of the Neurons chip, i.e., the upper- and lower-layer functionality thereof as described generally above, make possible the selective programming of the Neuron® chip to recognize and interface with the specific communication protocol of an RS-232 device or like serial device. In this regard, the upper-layer network functions receive data bit streams to which are attached the specific protocol codes of either the network device 20 or the serial device 30, and convert those data bit streams to a format recognizable by the other device. A memory device 14 is necessary for storing the user-programmable commands identifying the serial-device specific communication protocol being interfaced to the network. The network command instructions, and in particular those associated with, for example the Lonworks® network protocol, are hardcoded in the Neuron® chip (lower-layer functionality) and. are not user-modifiable.

Each converter 10 must therefore be uniquely programmed to interface with a specific serial device. The disadvantage of this is that once programmed to interface with one serial device, such as a gas analyzer based on a specific type of RS-232 standard, the same converter is not readily adaptable for use with a different serial device, such as a dynamometer which typically uses different RS-232-type protocol codes.

The specifications for the Neuron® chip indicate that it is configurable for connection to an external UART for the express purpose of buffering high-speed, serial, data bit streams, such as may be transmitted from a serial device transmitting data at a very fast baud rate. However, the Neuron® chip does not include on-chip, UART circuitry as part of its built-in hardware. Consequently, the converter 10 must be provided with an external UART which, if not anticipated in advance, is difficult to add to a pre-designed converter board.

It would be a great advancement in the art to be able to provide a converter 10 as generally described above, but which can be customized to interface with any one of many different types of serial devices, including RS-232 serial devices operating at very fast baud rates.

SUMMARY OF THE INVENTION

It is a general object of the invention to provide a converter for interfacing a network device to any one of several different types of serial devices.

It is a further object of the present invention to provide a converter which is user-adjustable for interfacing a network device to any one of different types of serial devices, including different types of RS-232 devices.

It is yet a further object of the present invention to provide a connector for interfacing any one of different serial devices to a network, the converter being of the type including a Neuron® chip to process network multi-layered functions.

It is yet a further object of the present invention to provide a converter for interfading any one of different serial devices, including a gas analyzer or a dynamometer, to a network device, such as an engine analyzer employing a Lonworks® protocol communication standard.

Certain ones of these other features of the present invention are attained by providing an intelligent converter programmably adaptable for interfacing a data processing system to a selected one of plural serial devices each responsive to a serial data bit stream of a device-specific data communication format. The data processing system is adapted for communication with externally coupled resources in accordance with a predefined network communication protocol, of the type including user-programmable network function layers and non-programmable network function layers to ensure the integrity of and coordinate transfer of data therebetween. The converter includes a network-to-converter interface circuit for electrically coupling the converter to the data processing system to facilitate data transfer therebetween in a format prescribed by the network protocol. A serial device-to-converter interface electrically couples the converter to the selected serial device to facilitate data transfer therebetween in the associated data communication format. Further included is a first processing device coupled to the network-to-converter interface circuit and a second processing device coupled to the serial device-to-converter interface circuit and responsive to signals from the first processing device to facilitate the transfer of data therefrom to the serial device in the associated data communication format, via the serial device-to-converter interface circuit. The first processing device includes a first circuit for ensuring the integrity of data transfers between the serial device and the data processing system in accordance with the non-programmable network function layers associated with the network communication protocol. The first processing device also includes a second circuit for facilitating the transfer of data in a predetermined user-defined format between the data processing system and the second processing device in accordance with the user-programmable network function layers.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENTS

Figure 1:
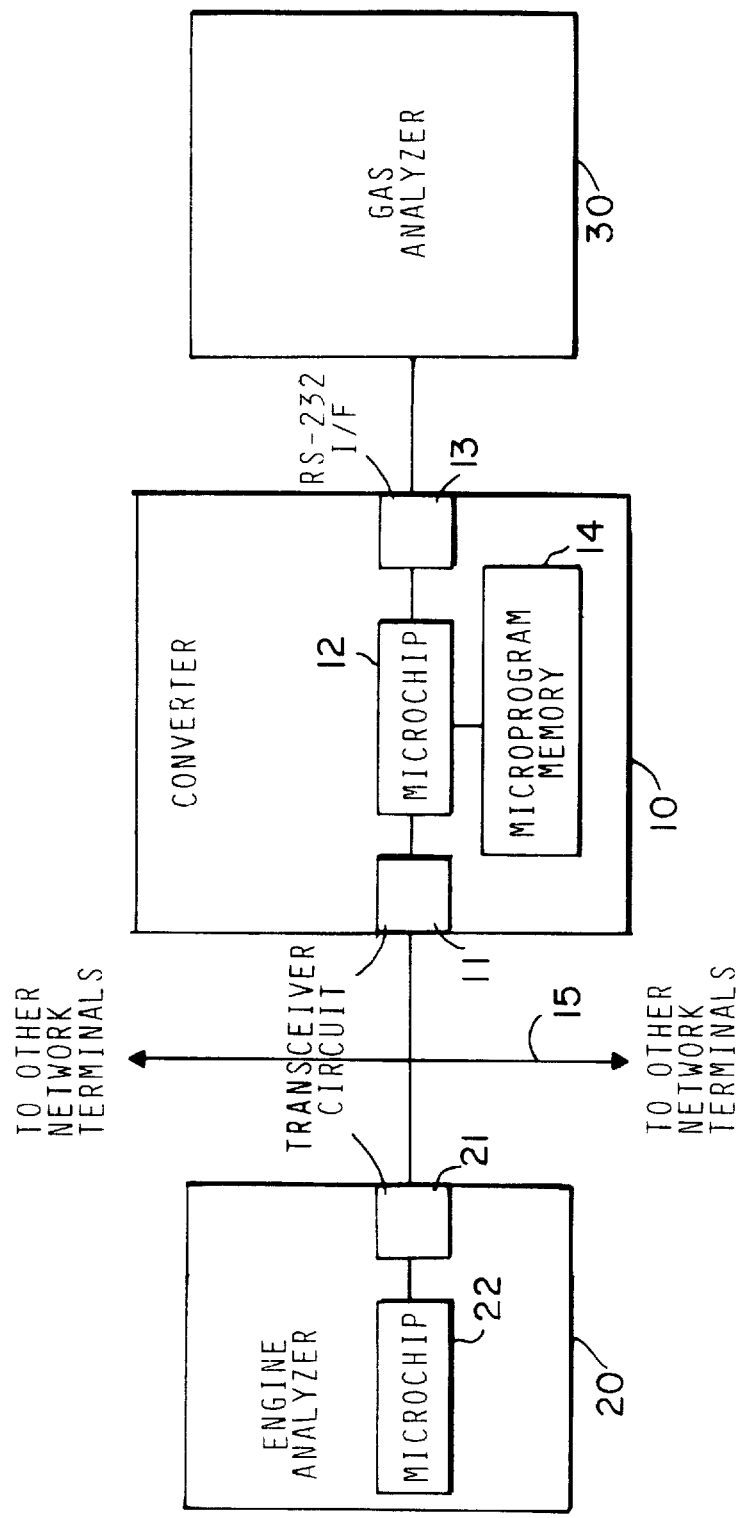
FIG. 1 is a functional block diagram of a prior art converter for interfacing an engine analyzer employing a network protocol communication standard to a specific type of RS-232 gas analyzer serial device.
Figure 2:
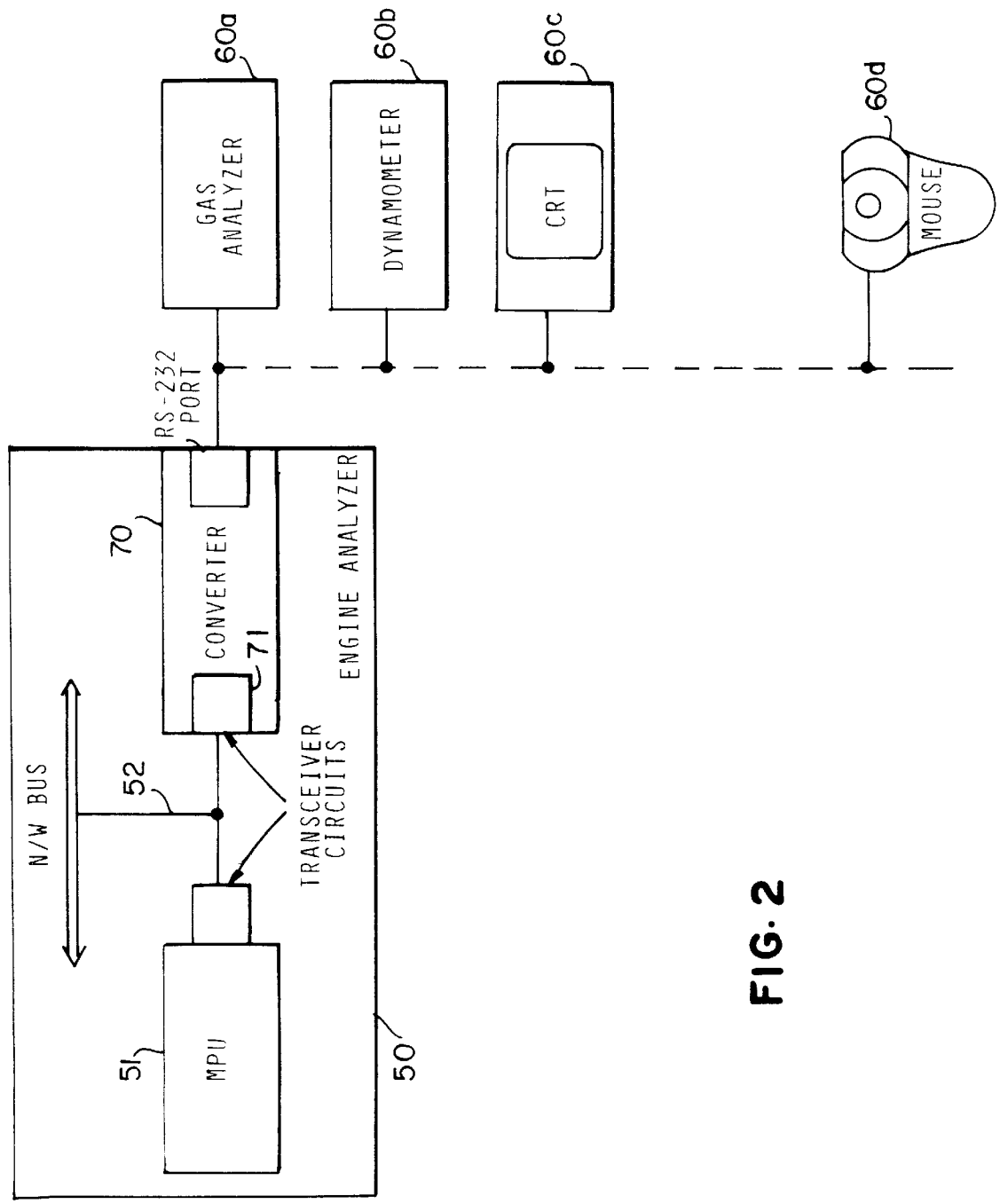
FIG. 2 is a functional block diagram of an engine analyzer, employing a network protocol communication standard, interfaced with any one of several different types of serial devices by a converter constructed in accordance with the present invention.

Turning now to FIG. 2, there is shown a network device 50 and four serial RS-232-type devices, including a gas analyzer 60a, a dynamometer 60b, a cathode ray tube (CRT) display 60c, and a mouse 60d, any one of which serial devices may be coupled to the network device 50 by way of an intelligent converter 70, constructed in accordance with the present invention.

In the illustrative embodiment, network device 50 may be an engine analyzer employing the Lonworks™ network protocol and includes a main processing unit (MPU) 51 which handles all internal system processing functions, as well as all control functions relating to its interface to other terminals connected to the Lonworks™ network. It should be appreciated, however, that the network device 50 could also be provided with a dedicated processor, such as a separate Neuron® chip, which handles control of the network interface separate from the terminal main processor 51. Data packets are transmitted to and from the network bus over a network communication line 52, such as twisted-pair cabling, an RS-485 line, or other suitable network medium, which is coupled to both the converter 70 and the MPU 51 (or dedicated processor). The converter 70 is shown internal to the network device 50, but may instead be a self-contained unit outside the device 50.

Figure 3:
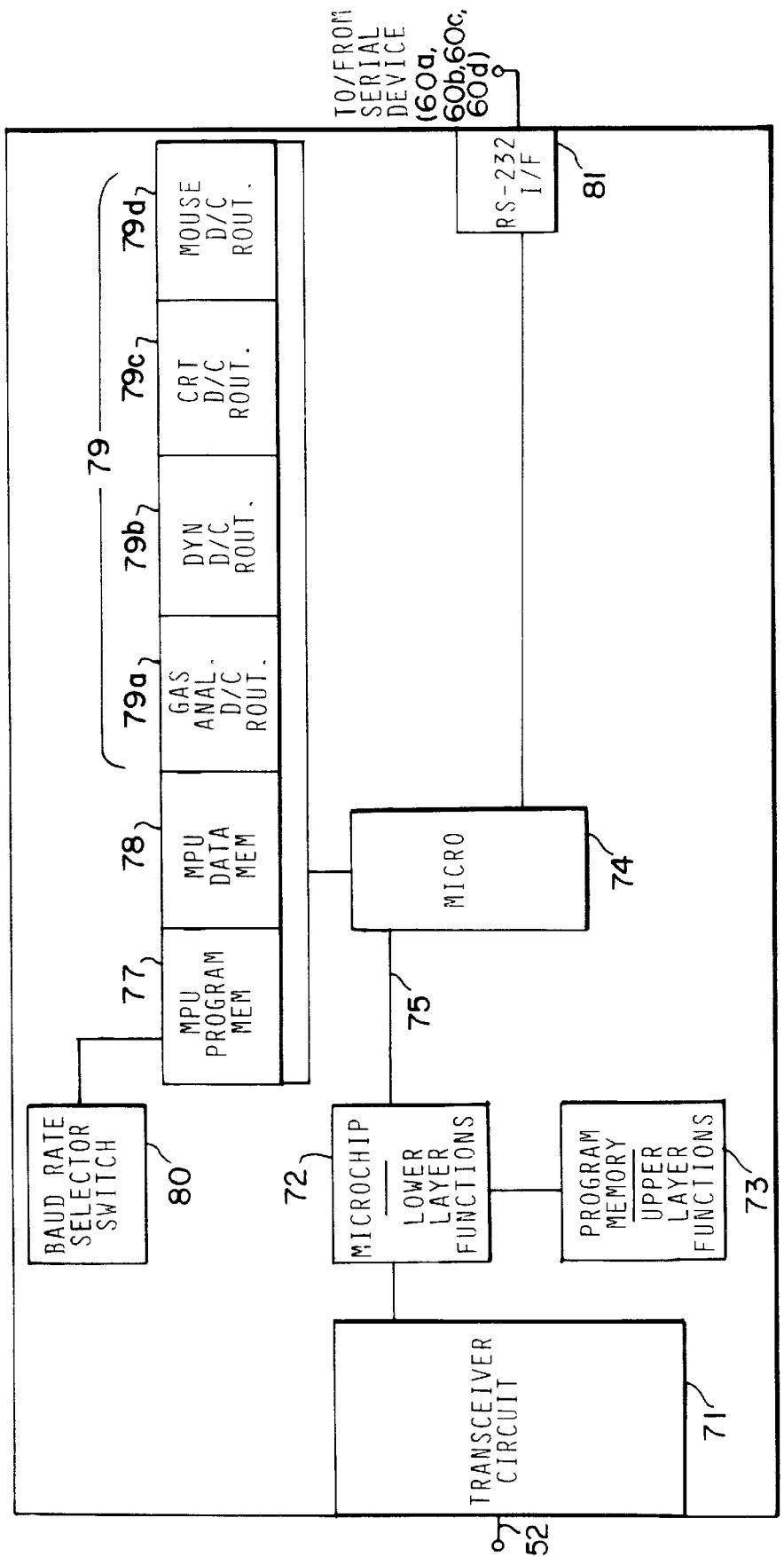
FIG. 3 shows in block diagrammatic form the individual components of the converter of FIG. 2.

Referring now also to FIG. 3, the converter 70 is shown in greater detail and comprises a transceiver circuit 71 for converting between signals on the network-communication line 52 and voltage levels recognizable by an on-board Neuron® chip 72. Attached to the Neuron® chip. 72 is a neuron program memory device 73 which includes, among other things, the user-programmable upper layer instructions which direct the flow of data through the Neuron® chip, as will be explained below. A microprocessor 74, such as an Intel 8051 integrated circuit, is coupled by way of a bi-directional parallel line 75, to the Neuron® chip 72. The microprocessor 74 includes a dedicated memory device 76 which provides storage for program memory 77, data memory 78 and externally programmable data conversion routines 79, including a gas analyzer data conversion routine 79a, a dynamometer data conversion routine 79b, a CRT data conversion routine 79c, and a mouse data conversion routine 79d, the codes of which allow interfacing the converter 70 to the serial gas analyzer 60a, dynamometer 60b, CRT 60c, or mouse 60d, respectively.

The dedicated memory device 76 may be a WSI-311 integrated circuit and may include an optional on-board baud rate selector switch 80 which allows for the setting, by way of jumpers or the like, of the baud rate transmission speed of data flowing between the MPU 74 and an RS-232 interface circuit 81 (such as a Motorola MC 145407), which converts between TTL and CMOS input and output levels and RS-232 voltage levels. The RS-232 devices 60a–60d are adaptable for connection to the RS-232 interface circuit 81.

Data transfer between any one of the RS-232 devices 60a–60d which may be coupled at any time to the engine analyzer 50 will now be explained. As an initial step, after a serial device is connected to the analyzer 50 at the interface circuit 81, the operator must inform or alert the converter 70 which one of the various serial devices for which an associated data format conversion routine is available in microprocessing memory device 76, is attached. The operator may do this any number of ways, including by way of keyboard-entered instructions, or by way of microprocessor programming-recognizable jumper settings on the converter board. Once the device is identified, the operator may then optionally elect to change the jumper settings which control the baud rate at which data bit streams will be transmitted to and from the RS-232 serial device. Because the 8051 Intel microprocessor 74 includes an on-chip UART (not shown), a separate UART to buffer data bit streams from an RS-232 device running at a high-baud rate is unnecessary.

Once the baud rate selector switch 80 is set and the converter 70 is made aware of which of the recognizable (preprogrammed) RS-232 devices 60a–60d is physically attached, data transfer will occur automatically and effortlessly. It should be understood that the converter 70 will not recognize the communication protocol for a device for which a specific data conversion routine has not been stored in the memory device 76 and selected by the user. In such a case, data transfer will not occur.

When properly configured, data transfer to and from the network device 50 and any one of the serial devices 60a–60d attached is possible. The network device 50 transmits data in the form of data packets. The data packets are received by the converter transceiver circuit 71, digitized if necessary, and then fed to the Neuron® chip 72. The Neuron® chip 72, as explained in the Description of the Prior Art, is a multilayered device. In connection with the present invention, the lower-layer functions of the Neuron® chip 72 are hard coded to perform non-user programmable network control functions. The upper-layer functions are user programmed, the code for which may be stored in the neuron program memory device 73, to receive the data portion of the data packets transmitted from the network device 50 and to pass those out on a parallel bus 75 for processing by the microprocessor 74.

Depending on which RS-232 device is selected as the attached device, the microprocessor 74 will convert the parallel data into a serial data bit stream with appropriate protocol codes attached thereto, the appropriate data conversion routine having been user-selected for this purpose. For example, if the gas analyzer 60a is attached to the converter 70, the microprocessor 74 will process the gas analyzer data conversion routine 79a to generate a serial data bit stream which is comprehensible to the gas analyzer 60a, i.e., the data format is in a form which the gas analyzer 60a recognizes.

Similarly, when an attached one of the serial devices 60a–60d transmits data to the engine analyzer 50, it does by transmitting data in the data format for which it was designed. The serial device will generate a data bit stream, typically in the form of consecutive, serial character streams, each including a start and a stop bit. The RS-232 interface circuit 81 will convert the RS-232 voltage level signals to TTL level and pass the serial data to the microprocessor 74. The microprocessor 74 buffers the data (the internal UART may be used for this purpose) and then, on the basis of the data conversion routine associated with the particular serial device attached, feeds the data over parallel bus 75 to the Neuron® chip 72. The Neuron® chip 72, under program control, performs the necessary network (e.g., Lonworks™) protocol multi-layered operations and, when appropriate, will output the data, in packet form, via converter transceiver circuit 71 and lines 52, to the engine analyzer MPU 51, which processes the data.

Data transfer through the converter 70 is bi-directional. All conflicts and related network functions are handled by the Neuron® chip and are invisible to an attached serial device.

The present invention provides added flexibility by allowing a multi-layered network device of the type which can be interfaced with the Neuron® chip to be configured for communication with any one of a variety of different serial devices.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An intelligent converter programmably adaptable for interfacing a data processing system to a selected one of plural serial devices each responsive to a serial data bit stream of a device-specific data communication format, said data processing system being adapted for coupling to a network for communication with other nodes of the network in accordance with a predefined network communication protocol of the type including user-programmable network function layers and non-programmable network function layers, said converter comprising:

- a network interface circuit for electrically coupling the converter to the data processing system to facilitate data transfer therebetween in a format prescribed by said network protocol;
- a serial device interface for electrically coupling the converter to the selected serial device to facilitate data transfer therebetween in the associated data communication format;
- first processing means coupled to said network interface circuit;
- second processing means coupled to said serial device interface circuit and responsive to signals from said first processing means to facilitate the transfer of data from said first processing means to the serial device in said associated data communication format, via the serial device interface circuit,
- said first processing means including means for ensuring the integrity of data transfers between said selected serial device and said data processing system in accordance with the non-programmable network function layers associated with said network communication protocol;
- program memory means coupled to said first processing means for facilitating the transfer of data in a predetermined user-defined format between said data processing system and said second processing means in accordance with said user-programmable network function layers; and
- a memory device coupled to said second processing means for storing appropriate data format conversion routines respectively corresponding to said plural serial devices to allow the first processing means to selectively interface with the selected serial device.

2. The converter of claim 1, wherein said first processing means is a Neuron® chip.

3. The converter of claim 1, wherein said second processing means is a microprocessor integrated circuit.

4. The converter of claim 1, wherein said serial device uses an RS-232 communications standard.

5. The converter of claim 1, wherein said non-programmable network function layers are network function routines including routines for coordinating at least one of the following functions: media access control, collision avoidance, data transfer acknowledgements, retries, duplicate message detection, message validation, message authentication, and priority processing.

6. The converter of claim 1, wherein said user-programmable network function layers are function specific routines which provide for the transfer of data in said user-determined format.

7. The converter of claim 6, wherein said function specific routines provide for the transfer of data between the first and second processing means by way of a parallel data bus, all data being transmitted in a parallel data stream.

8. The converter of claim 1, wherein said first processing means includes a UART to buffer high-speed data transmission from said serial device.

9. The converter of claim 1, wherein said serial device is a gas analyzer and said data processing system is an engine analyzer.

10. The converter of claim 1, wherein said serial device is a dynamometer and said data processing system is an engine analyzer.

11. The converter of claim 1, further comprising means for setting the baud rate of data transfer from the converter to the selected serial device.

12. The converter of claim 11, wherein said means for setting the baud rate includes selector switch terminals each associated with a specific baud rate value.

13. The converter of claim 1, wherein said network interface circuit is adapted to receive one of twisted pair, radio-frequency, RS-485, power carrier lines or infrared signals from the data processing system.

14. The converter of claim 1, wherein said RS-232 device is a mouse or a CRT.

15. An intelligent converter programmably adaptable for interfacing a data processing system to a selected one of plural serial devices each responsive to a serial data bit stream of a device-specific data communication format, said data processing system being adapted for coupling to a network for communication with other nodes of the network in accordance with a predefined network communication protocol of the type including user-programmable network function layers and non-programmable network function layers, said converter comprising:

- a network interface circuit for electrically coupling the converter to the data processing system to facilitate data transfer therebetween in a format prescribed by said network protocol;
- a serial device interface for electrically coupling the converter to the selected serial device to facilitate data transfer therebetween in the associated data communication format;
- first processing means coupled to said network interface circuit;
- second processing means coupled to said serial device interface circuit and responsive to signals from said first processing means to facilitate the transfer of data from said first processing means to the serial device in said associated data communication format, via the serial device interface circuit;
- a first memory device coupled to the first processing means and cooperating therewith for controlling data transfers between the selected serial device and the data processing system in accordance with the user-programmable and the non-programmable layers of the network communication protocol; and
- a memory device coupled to said second processing means for storing appropriate data format conversion routines respectively corresponding to said plural serial devices to allow the first processing means to selectively interface with a selected one of said plural serial devices.

16. The converter of claim 15, and further comprising means coupled to said memory device for setting the baud rate of data transfer from the converter to the selected serial device.

17. The converter of claim 15 wherein said first processing means includes means for ensuring the integrity of data transfers between said selected serial device and said data processing system in accordance with the non-programmable network function layers associated with said network communication protocol and further comprising program memory means coupled to said first processing means for facilitating the transfer of data in a predetermined user-defined format between said data processing system and said second processing means in accordance with said user-programmable network function layers.

* * * * *